(No Model.)
J. ATKINSON & C. F. PLUNKETT.
PIPE COUPLING FOR WATER CLOSET BOWLS, &c.
No. 567,115. Patented Sept. 1, 1896.
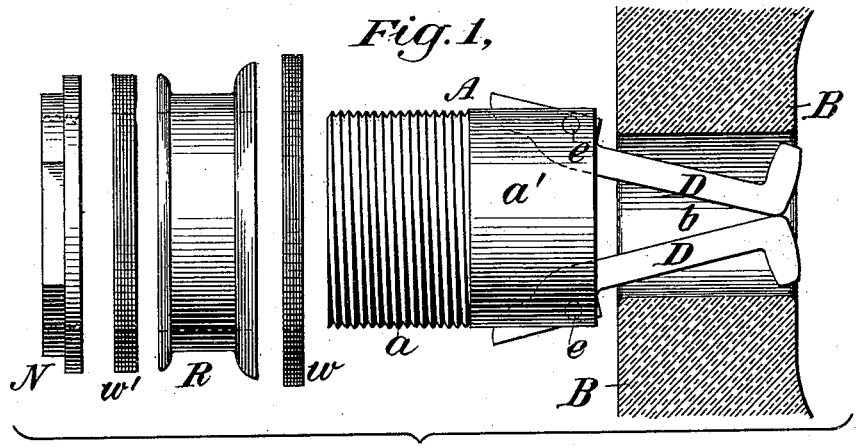
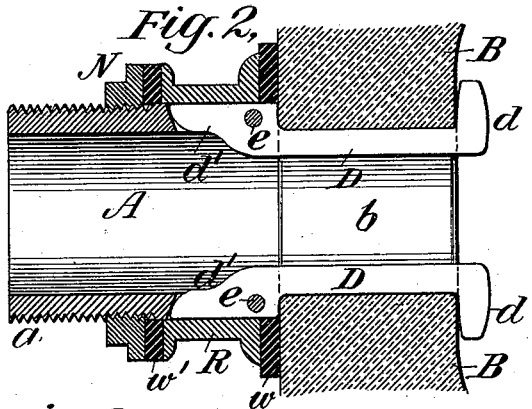
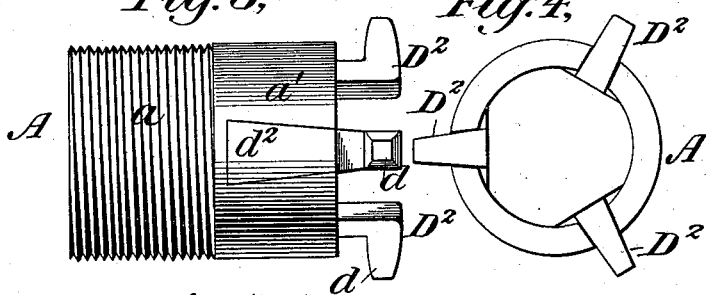
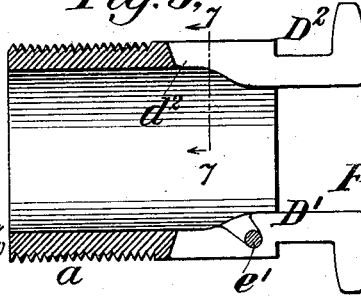
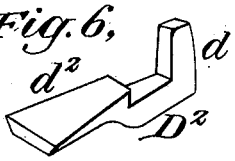
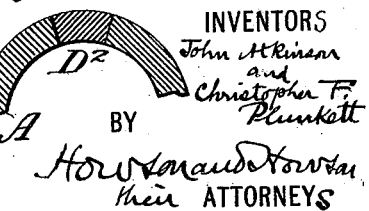
WITNESSES:
INVENTORS
John Atkinson
and
Christopher F. Plunkett
BY
Howson and Howson
their ATTORNEYS
THE NORRIS PETERS CO., PHOTO-LITHO., WASHINGTON, D. C.

UNITED STATES PATENT OFFICE.

JOHN ATKINSON AND CHRISTOPHER F. PLUNKETT, OF NEW YORK, N. Y.

PIPE-COUPLING FOR WATER-CLOSET BOWLS, &c.

SPECIFICATION forming part of Letters Patent No. 567,115, dated September 1, 1896.

Application filed December 6, 1895. Serial No. 571,317. (No model.)

*To all whom it may concern:*

Be it known that we, JOHN ATKINSON and CHRISTOPHER F. PLUNKETT, of New York city, New York, have invented an Improved Pipe-Coupling for Water-Closet Bowls, &c., of which the following is a specification.

Our invention consists of an improved pipe-coupling which, while applicable in various connections, is especially adapted to connect water-pipes to earthenware or other bowls, such as water-closets, either where the bowls are in the first place constructed for such application or by way of repair.

The object of our invention is to construct a simple, strong, and efficient pipe connection of this character which can be applied without special skill and will make a good joint, will require no extra parts for connection with the main piping, and will not interfere with the flow of water through the connection.

In the accompanying drawings, Figure 1 is a view of the several parts of our improved coupling detached from each other and as they are ready to be applied. Fig. 2 represents the several parts of the coupling in place. Figs. 3 and 4 are side and end views, respectively, of a modification. Fig. 5 is a sectional view illustrating other modifications. Fig. 6 is a perspective view of a part. Fig. 7 is a sectional view on the line 7 7, Fig. 5.

In Figs. 1 and 2, B represents the bowl or other part to which the piping is to be connected by means of our coupling. As the coupling is especially applicable to the connection of the water-supply pipe to the earthenware bowl of water-closets, either where the bowl is specially constructed for this character of connection or where a cracked or broken "horn" requires the connection to be repaired, we will for convenience refer to the part B as the "bowl," the openings $b$ therein being for the passage of water to flush the bowl. In case of repair of an old-style bowl, the horn of the bowl is to be chipped off, as will be understood.

The main body of our coupling consists of a short tube A, threaded at its outer end $a$ with a thread of standard gage for connection with standard piping. The inner end $a'$ of the tube A is left plain on its exterior, as shown in Figs. 1 and 3. This plain end of the tube is slotted, and we combine therewith two or more swinging fingers D D, hooked at their outer ends $d$ and at their inner ends $d'$, working in the slots in the plain part of the tube A. The outer ends of these swinging fingers, projecting beyond the end of the tube, will vary in length and shape with the character of the bowl or other part to which the coupling is to be fixed. We have shown different lengths and shapes of these fingers in the different figures of the drawings. These fingers may be swung in the slots of the tube A either with or without the use of a pivot-pin. In Figs. 1 and 2 we have shown the fingers as pivoted to the tube by means of inserted pins $e$, while in the lower part of Fig. 5 the finger D' is shown as pivoted upon a bridge or pin $e'$, cast in one with the tube, the finger D' having an open slot in such case for its insertion into place in the slot in the tube and over this bridge or pin $e'$.

In Figs. 3, 4, 6, and 7 and in the upper part of Fig. 5 I have shown the fingers $D^2$ as hung in the slots of the tube without the use of any pivot-pin, the inner or rear end $d^2$ of each finger being in such case undercut or shouldered and the slot in which it fits correspondingly shaped, as shown in Figs. 6 and 7, in order to hold the fingers in place when they are arranged in their slots parallel with the axis of the tube, as illustrated in Figs. 3, 4, 5, and 7. The outer or hooked ends of the fingers $D^2$ are, however, provided with practically parallel side walls, as illustrated in Figs. 3 and 6, in order to let the fingers be moved to a position, such as indicated in Fig. 1, for the insertion of the hooked ends of the fingers through the opening $b$ in the bowl or other part to which the coupling is to be attached. Whether pivot-pins $e$ or $e'$ be used or not, however, we make the inner end of each finger and its slot shouldered, as by making them wedge-shaped, as shown in Fig. 3, in order that the body of the tube A may take directly the longitudinal pull which would otherwise have to be sustained by the pivot-pins of the swinging fingers.

In each construction the fingers D, D', or $D^2$ are adapted to have their outer hooked ends swing inward, as represented in Fig. 1, sufficiently to let the hooks pass through the opening $b$, and then to have such ends swing outward, as represented in Fig. 2, to engage with the shoulders on the inner side of the bowl. The fingers are then to be confined or maintained in this position approximately parallel with the axis of the tube by slipping a ring R with a plain inner face over the plain end $a'$ of the tube A and over the inner ends $d'$ or $d^2$ of the fingers, as represented in Fig. 2. A suitable washer $w$ is interposed between the end of the ring R and the bowl or other surface B to make a water-tight joint there. This joint is made tight, and the ring R is securely held in place by means of a nut N, screwed onto the threaded end of the tube A, a second washer $w'$ being interposed between the ring R and the nut N.

We claim as our invention—

1. A pipe connection comprising a tube threaded at its outer end and slotted at its inner end with fingers having hooked ends projecting beyond the end of the tube and swung in slots in the said tube, a plain ring to fit over the tube and confine the inner ends of the fingers in the slots, a nut to screw onto the threaded end of the tube and washers, substantially as described.

2. A pipe-coupling comprising a tube threaded at its outer end and slotted at its inner end, with swinging fingers having hooked outer ends and shouldered inner ends working in said slots in the tube which slots are correspondingly shouldered, a ring with a plain inner face to confine the shouldered ends of the fingers in the slots, and a retaining-nut and washers, substantially as set forth.

3. A pipe connection, comprising a tube threaded at its outer end and slotted at its inner end with hooked fingers mounted on pivots in said slots, a ring to fit over the tube and confine the inner ends of the fingers and a retaining-nut and washers, substantially as described.

In witness whereof we have signed our names to this specification in the presence of two subscribing witnesses.

JOHN ATKINSON.
CHRISTOPHER F. PLUNKETT.

Witnesses:
EDITH J. GRISWOLD,
HUBERT HOWSON.